United States Patent [19]

Widl

[11] 4,227,150
[45] Oct. 7, 1980

[54] SYSTEM FOR INDICATING MEASURED VALUES

[75] Inventor: Gerhard Widl, Michelstadt, Fed. Rep. of Germany

[73] Assignee: VDO Adolf Schindling AG

[21] Appl. No.: 922,485

[22] Filed: Jul. 6, 1978

[30] Foreign Application Priority Data

Jul. 7, 1977 [DE] Fed. Rep. of Germany ....... 2730699

[51] Int. Cl.² .................................................. G01P 3/36
[52] U.S. Cl. .................................... 324/175; 324/173; 324/166
[58] Field of Search ............... 324/160, 161, 163, 166, 324/173–175, 162, 167, 78 D, 78 Z; 364/565

[56] References Cited

U.S. PATENT DOCUMENTS

| | | | |
|---|---|---|---|
| 3,398,288 | 8/1968 | Sanders et al. | 350/96.19 |
| 3,639,753 | 2/1972 | Reich | 324/173 |
| 3,731,301 | 5/1973 | Davis | 324/161 |
| 4,056,778 | 11/1977 | Randazzo | 324/166 |

FOREIGN PATENT DOCUMENTS

45-25637  8/1970  Japan ........................................ 324/163

Primary Examiner—Michael J. Tokar
Attorney, Agent, or Firm—Otto John Munz

[57] ABSTRACT

A system for indicating measured values, particularly the speed of movement of a motor vehicle, includes a pulse generator generating pulses having a frequency corresponding to a measured value, a counting circuit including first and second counters for counting pulses generated during successive time intervals to produce a pulse count signal for each time interval, a comparator comparing the pulse count signals from successive time intervals to produce a pulse difference signal corresponding to the difference therebetween, a memory for storing the pulse difference signal and transmitting the pulse difference signal to a stepper motor, and a pointer driven via gears from the output of the stepper motor to produce an indication of the measured value.

11 Claims, 2 Drawing Figures

SYSTEM FOR INDICATING MEASURED VALUES

BACKGROUND OF THE INVENTION

1. Field of the Invention

The present invention pertains to systems for indicating measured values and, more particularly, to systems for indicating the speed of movement of a motor vehicle.

2. Discussion of the Prior Art

Eddy current measuring mechanisms are conventionally utilized to indicate the speed of movement of a motor vehicle, such eddy current measuring mechanisms being formed, essentially, of a magnet rotatably driven by a flexible shaft such that the magnet, as a result of the formation of eddy currents, rotates a bell of conductive material coupled with a pointer to move the pointer at an angle dependent on the rate of revolution of the magnet. Tachometers of this type have many disadvantages including accuracy limited by the tolerances of the mechanical structure, the properties of the magnet, the electrical conductivity of the bell and manual calibration, undesirable size and space requirements, these flexible shafts used for driving the magnets have a limited life and tend to cause undesirable noises, and the rate of revolutions per distance indicative of the transmission ratio between distance covered and the number of revolutions of the flexible shaft must be mechanically coupled into the tachometer and is, therefore, relatively expensive.

Another mechanism for indicating the speed of movement of a motor vehicle utilizes a moving coil measuring system cooperating with a transmitter having a pulse forming stage to produce a pulse frequency corresponding to speed. Such systems utilize a frequency voltage transformer to produce an analog value which is supplied to an additional adapter stage, the voltage transformer converting the rate of revolutions per distance to an analog value for use in the system. The accuracy of such systems, especially over long periods of time, is limited not only by their dependence on analog values, but, further, due to their dependence upon the characteristics of the magnet of the moving coil measuring system, and such systems further suffer from the disadvantages of requiring the moving coil measuring system to be sufficiently damped to permit quiet operation and of being of an undesirably large size.

It is known to drive a kilometer counter by means of a stepper motor rotatable only in a single direction, the stepper motor receiving pulses generated by a transmitter via a transducer, the transmitter including two analog integration stages for converting the rate of revolutions to distance. A monostable multivibrator is coupled with the output of each integration stage; and, two integration branches, each formed of an integration stage and a multistable multivibrator, are connected in such a way to alternately control each other. The monostable multivibrators generate defined output pulses of constant duration which are fed to the field coils of the stepper motor. Such systems have limited accuracy, however, due to their operation primarily in an analog mode with inaccuracies being especially prevalent in the integration stages which require pulses supplied thereto of a precisely defined duration. Another disadvantage of such systems is the expense thereof.

SUMMARY OF THE INVENTION

Accordingly, it is a primary object of the present invention to overcome the above-mentioned disadvantages of the prior art by providing a system for indicating measured values, particularly the speed of movement of a motor vehicle, which is extremely accurate, is small in size and produces an indication by means of a pointer without utilizing a pendulum movement while being rugged to withstand the rigors of use in a motor vehicle without adversely affecting precision operation or indication.

Another object of the present invention is to utilize a stepper motor rotatable in both forward and backward directions to indicate a measured value, particularly the speed of movement of a motor vehicle.

The present invention has a further object in that pulses corresponding to a measured value are accumulated during successive time intervals, with the pulses accumulated during the successive time intervals compared to form a pulse difference signal. The pulse difference signal is stored and transmitted, as a train of pulses proportional to the difference between the number of pulses accumulated during the successive time intervals, to a stepper motor which has an output driving a pointer to produce an indication of the measured value.

An additional object of the present invention is to count pulses generated corresponding to a measured value during successive time intervals to produce a pulse count signal representing the average speed during each time interval, and comparing the pulse count signals for successive time intervals to produce a pulse difference signal representing a difference in the average speed during each of the successive time intervals, the pulse difference signal being transmitted to a stepper motor which has an output pointer indicating the speed prevailing during the last time interval such that the pointer is updated by the pulse difference signal to add or subtract the difference in the average speed of the next successive time interval.

Yet a further object of the present invention is to utilize a stepper motor to drive a speed indicating pointer and to supply signals to the stepper motor representative of a difference in measured speed during successive identical time intervals to cause corresponding movement of the stepper motor such that the stepper motor integrates the average speed during the last measuring time interval to cause the pointer to provide an indication of acceleration and deceleraton of a motor vehicle.

Another object of the present invention is to utilize a resettable counter for counting pulses corresponding to a measured value and receiving the output from a timing signal generator to count the pulses occurring during a predetermined time interval and a circuit, which may include a second resettable counter, receiving the pulse count signal from the first counter in a system for indicating measured values. The pulse count outputs of the counter and the circuit are supplied to a comparator which produces a pulse difference signal supplied to a memory, the pulse difference signal in the memory being transmitted to a stepper motor either by means of a constant frequency source or via the pulses corresponding to the measured value.

Yet an additional object of the present invention is to utilize a function generator producing a constant value connected either to a counter receiving pulses corresponding to a measured value or to a comparator receiving pulse count signals to produce a pulse difference signal corresponding to the difference therebetween, the constant value from the function generator being utilized to modify the output of the comparator to compensate for non-variable functions affecting speed measurement in a vehicle, such as, for example, the inflation of tires.

The present invention has a further object in that a system for indicating measured values utilizes digital circuitry to produce accurate indications simply and inexpensively while facilitating adjustment of the system to compensate for changing parameters.

Some of the advantages of the present invention over the prior art are that the system for indicating measured values of the present invention operates on a digital basis to produce high accuracy with minimal cost thereby rendering the system capable of indicating speeds in accordance with more severe legal requirements as well as for other purposes, such as: fuel consumption measurement; calibration of the system is simplified due to the relationship of the pulses supplied to the stepper motor and the incremental distance or movement of the stepper motor being prespecified; the stepper motor can be constructed in a compact manner such that the system is of extremely small size; the system is not adversely affected by vibrations since the pointer will not vary from the position it has reached when the vehicle is moving at a constant speed; and the system can be adjusted for operation at various rates of revolutions per distance simply and inexpensively.

The present invention is generally characterized in a system for indicating measured values including a pulse generator generating pulses having a frequency corresponding to a measured value, a counter coupled with the pulse generator for counting the pulses generated during successive time intervals to produce a pulse count signal for each time interval, a comparator coupled with the counter for comparing the pulse count signal produced during successive time intervals and producing a pulse difference signal corresponding to the difference between the pulse count signals of successive time intervals, a reversible stepper motor having an output for operating an indicator, and means supplying the pulse difference signal from the comparator to the stepper motor to drive the stepper motor in accordance with the pulse difference signal whereby the output of the stepper motor is moved step-by-step to provide an indication of changes in the measured value during successive time intervals.

Other objects and advantages of the present invention will become apparent from the following description of the preferred embodiment taken in conjunction with the accompanying drawings.

DESCRIPTION OF THE PREFERRED EMBODIMENTS

Figure 1:
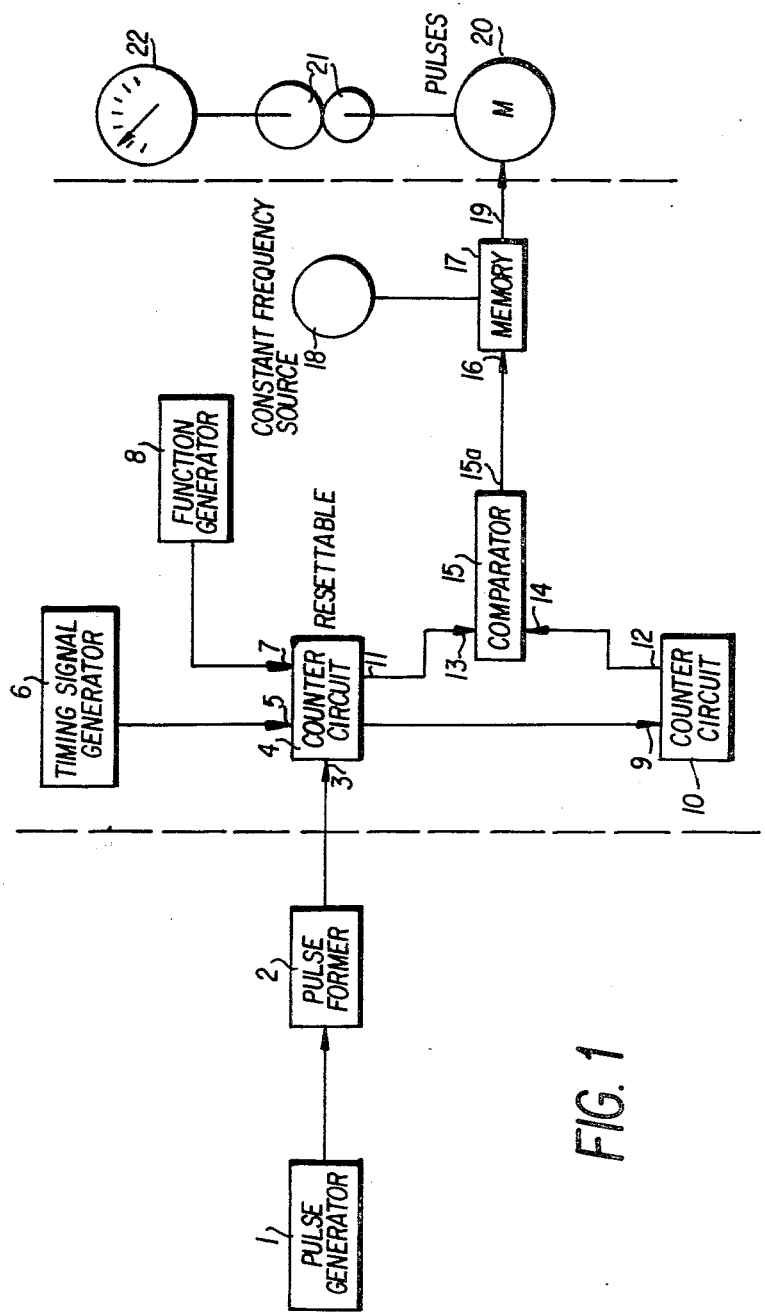
FIG. 1 is a schematic block diagram of a system for indicating measured values according to the present invention.

A system for indicating measured values according to the present invention is illustrated in FIG. 1 and includes a pulse generator 1 supplying pulses corresponding to a measured value to a pulse former or shaper 2.

The pulse generator 1 can be responsive to any suitable measurement but is preferably utilized with a motor vehicle to produce pulses corresponding to rotation of an object, such as a gear, such that one pulse is transmitted by the pulse generator per distance increment thereby relating the pulses to vehicle speed of movement. The shaped pulses from pulse former 2 are supplied to a counting input 3 of a counter circuit 4 which has a control input 5 receiving a timing signal from a timing signal generator 6, the timing signal determining successive time intervals during which pulses from pulse generator 1 are counted by counter circuit 4. The counter circuit 4 has a computer input 7 for receiving a constant value from a function generator 8 such that the count in the counter circuit can be altered in accordance with a constant value dependent upon the value supplied by function generator 8.

The counter circuit 4 produces a pulse count signal which is supplied to a transmission input 9 of a counter circuit 10, and the counter circuit 4 also has a pulse count output 11 supplied to an input 13 of a comparator 15 which has a second input 14 receiving a pulse counter output 12 from counter circuit 10. The comparator 15 has an output 15a supplying a positive or negative (sign evaluated) pulse difference signal to an input 16 of a memory 17 for storing the pulse difference signal. The stored pulse difference signal is read out of the memory 17 and transmitted to a reversible stepper motor 20 via an output 19 by means of a constant frequency source 18 such that the stepper motor 20 will be rotated either forward or backward in accordance with the pulse difference signal transmitted thereto from memory 17. The stepper motor 20 has an output driving a gear mechanism 21 which, in turn, drives a pointer 22 of an indicating dial, the pointer providing an indication of the speed of movement of a vehicle or any other measured value.

In operation, pulses from pulse generator 1 corresponding to the measured value are supplied via pulse former 2 to the counter circuit 4 which counts the pulses generated during a first time interval determined by timing signal generator 6, the timing signal resetting the counter circuit 4 at the end of the first time interval and causing a count pulse output to be supplied to counter circuit 10 via input 9. In this manner, after the first time interval has passed, counter circuit 10 will store a pulse count signal corresponding to the average speed of the vehicle during the first time interval while the counter circuit 4 is reset such that during a second identical time interval determined by timing signal generator 6, counter circuit 4 counts pulses occurring during the next successive time interval. Accordingly, the counter circuit 4 will now accumulate pulses corresponding to the average speed during a second successive time interval; and, after termination of the second time interval, the pulse count signals accumulated during the successive time intervals are supplied to comparator 15 via inputs 14 and 13 to produce at output 15a a sign-evaluated pulse difference signal corresponding to the difference in pulses received during the successive time intervals and, therefore, corresponding to the variation in the average speed of the vehicle during the successive time intervals.

The pulse difference signal from comparator 15 is stored in memory 17; and, during the next successive time interval of operation of counter circuits 4 and 10, the pulse difference signal in memory 17 is transmitted to stepper motor 20 by the constant frequency signals from source 18 such that the stepper motor turns step-by-step forward or backward relative to the sign-evaluated pulse difference signal supplied thereto. In this manner, an increase or decrease in speed is represented by movement of the pointer via the gear mechanism 21. During the time a pulse difference signal is transmitted to stepper motor 20, the count pulse signal in counter circuit 4 will have been transferred to counter circuit 10 and counter circuit 4 will be counting the pulses occurring during the next successive time interval such that when this time interval is terminated, comparator 15 can again produce a pulse difference signal for storage in memory 17 and eventual transmission via constant frequency source 18 to stepper motor 20. Thus, the comparator 15, after each time interval, calculates the variation in the average speed during that time interval with respect to the average speed of the previous time interval, and the pulse difference signals corresponding to such calculations are utilized by the stepper motor to integrate such calculations with movement of the pointer 22 so that the position of the pointer 22 corresponds to the prevailing speed which was reached during the last time interval, the indication by the pointer 22 taking place to a large extent without any delay.

The counts accumulated by either of counter circuits 4 or 10 can be altered by a constant value at the termination of each time interval by the programmed constant value supplied from function generator 8; and, in this way, the pulse count signal from the counter circuits can be varied in accordance with the constant value while being represented digitally. Counter circuit 4 can include an arithmatic logic circuit such that the constant value from function generator 8 can be multiplied times the pulse count accumulated in the counter circuit to modify the rate of revolutions per distance of the pulse generator 1 in a simple and inexpensive manner. Additionally, the output of the function generator 8 can be utilized to provide pulse count signals which are non-linear functions of the pulses counted during a time interval such that, for example, the indication of the speed of movement of a motor vehicle can be extended in the range around 50 kilometers per hour, which range is of particular interest to drivers.

Figure 2:
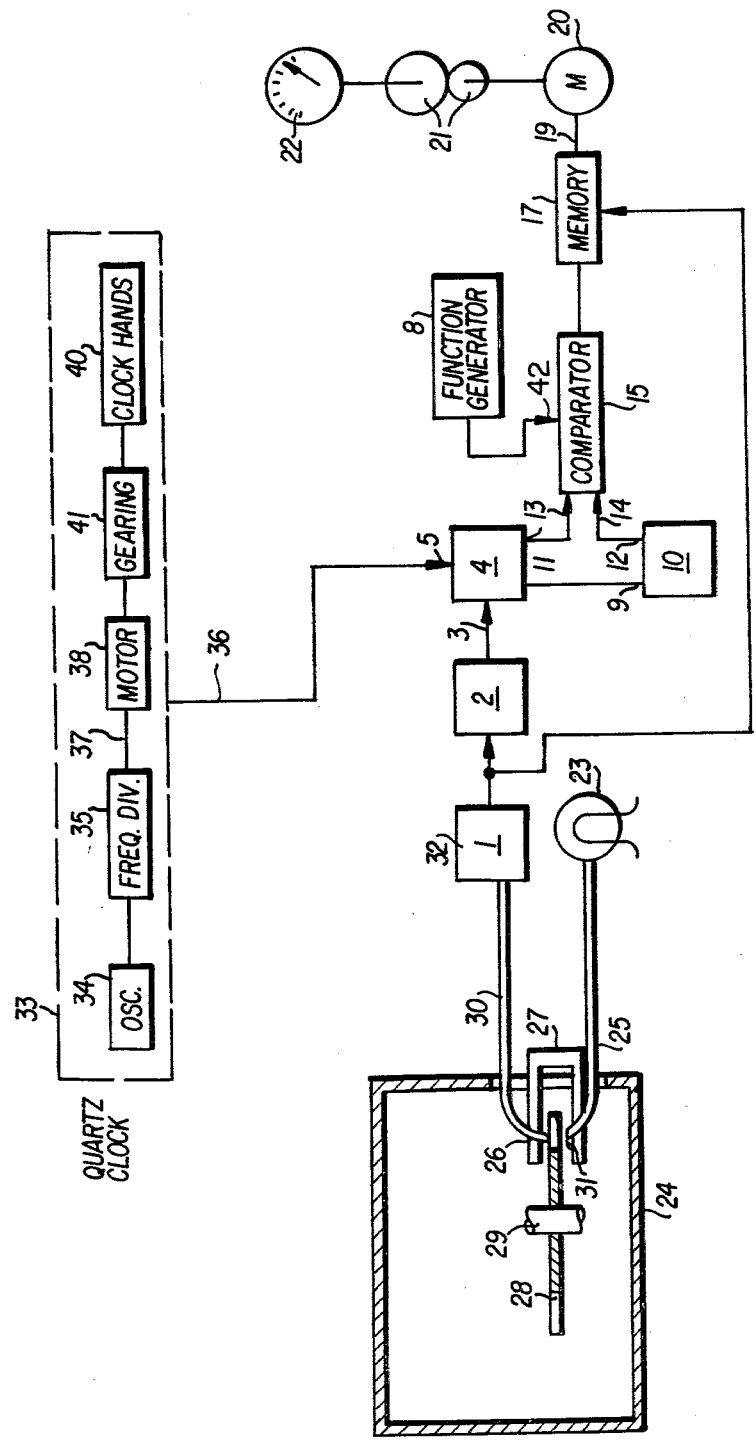
FIG. 2 is a schematic block diagram of another embodiment of a system for indicating measured values according to the present invention.

Another embodiment of a system for indicating measured values according to the present invention is illustrated in FIG. 2, and components of the system of FIG. 2 identical to components utilized in the system of FIG. 1 are given identical reference numbers and are not described again. The primary differences between the embodiments of FIGS. 1 and 2 are that a specific manner of generating pulses corresponding to speed of a motor vehicle is illustrated, the timing signal is developed from a quartz clock normally utilized in a motor vehicle to operate a clock showing time of day, the function generator supplies constant values to comparator 15 rather than to the counting circuit, and pulses for transmitting the pulse difference signal stored in memory to the stepper motor are derived from the pulse generator rather than from a separate constant frequency source.

In the system of FIG. 2, a light source 23, such as an incandescent lamp, transmits light to a position within a housing 24 via a fiberoptic element 25 which has a light exit end 26 mounted by means of a support 27 on one side of a rotating gear 28 driven by a shaft 29. Another fiberoptic element 30 has light entry end 31 mounted on support 27 to be disposed on the opposite side of gear 28 from the end 26 of fiberoptic element 25, and the fiberoptic element 30 transmits light to pulse generator 1 which includes a photoelectric detector, generally indicated at 32, for producing electrical pulses corresponding to light pulses received via fiberoptic element 30. The pulse generator 1 can include any suitable conventional circuitry for forming pulses in response to received light pulses, it being appreciated that the teeth of the gear 28 will interrupt the transmission of light between the ends 26 and 31 of the fiberoptic elements to create light pulses corresponding to movement of the gear and, therefore, corresponding to movement of a vehicle. The pulse output from pulse generator 1 is supplied to pulse former and shaper 2 and also to memory 17. More specific details of an optical system for generating pulses corresponding to a measured value can be found in U.S. patent application Ser. No. 922,484 of the present inventor filed concurrently herewith, such patent application being incorporated herein by reference.

A timing signal generator 33 for the system of FIG. 2 derives a timing signal from the quartz oscillator circuitry conventionally utilized to operate a clock showing the time of day, such quartz oscillator circuits and clocks being conventionally provided in motor vehicles. The timing signal generator 33 includes a quartz oscillator 34 supplying a constant frequency signal to a frequency divider 35 which supplies an output at 36 to input 5 of counter 4 at the termination of each time interval, the frequency divider also having an output 37 driving a motor 38 to operate a clock 40 via a gear mechanism 41. The function generator 8 is programmed to supply a constant value signal to comparator 15, the comparator 15 containing suitable arithmetic logic circuitry to permit the pulse difference signal derived from the pulse count signals of successive time intervals to be altered in accordance with the constant value in a similar manner to that described with respect to the system of FIG. 1.

In operation, as gear 28 rotates, light pulses are supplied to photoelectric detector 32 to form electrical pulses corresponding thereto, and such pulses are counted during successive time intervals via the counting circuitry formed by counter circuits 4 and 10 for supply to the comparator 15, the successive time intervals being controlled by the output 36 from the frequency divider 35 of the timing signal generator 33. The operation of the counting circuitry is the same as that described above with respect to the system of FIG. 1 with the exception that the constant value from function generator 8 modifies the pulse difference signal in comparator 15 rather than modifying the pulse counts in either of the counter circuits 4 or 10. The pulse difference signal is stored in memory 17 and is transmitted to stepper motor 20 by pulses generated by pulse generator 1, thereby obviating the necessity of a separate constant frequency source as utilized in the system of FIG. 1. Since the pulses from pulse generator 1 will not be of a constant frequency, it is possible that the pulse difference signal stored in memory 17 will not be completely transmitted to stepper motor 21 during a single time interval; however, in this case, the residual pulses not transmitted will remain in the memory 17 and will be added to the pulse difference signal supplied to the memory during the next time interval such that indication accuracy will not be adversely affected.

The specific circuitry of counter circuits 4 and 10 has not been illustrated in detail in that such circuitry is conventional, it being appreciated that counter 4 contains logic circuitry to permit counting of pulses received at input 3 and logic circuitry responsive to an input at 5 to supply a pulse count signal to counter circuit 10 and to comparator 15 while resetting the counter for the next time interval. The counter circuit 4 also includes an arithmatic circuit for use with the constant value from function generator 8 to vary or scale the pulse count output, as desired, in the embodiment of FIG. 1, similar arithmatic logic circuitry being utilized in the comparator 15 in the embodiment of FIG. 2. The counter circuit 10 need not count pulses but could be designed in the form of a memory or register for receiving a pulse count signal from counter circuit 4 and supplying such signal to comparator 15; and, similarly, the memory 17 could be formed by a shift register to store the pulse difference signals from comparator 15 for later transmission to stepper motor 20. The memory 17 stores the pulse difference signal in the form of a train of pulses which are transmitted to the field coils of the stepper motor in order to turn the rotor of the stepper motor in a step-by-step manner in a prespecified angle in response to each pulse.

The supplying of a constant value to modify or scale the pulse outputs of the system provides a simple and inexpensive method to vary the system response in accordance with the rate of revolutions per distance characteristics of the pulses supplied by pulse generator 1. With the constant value supplied to counter circuit 4, the constant value can be digitally included in the pulse count contained in the counter thereby retaining the accuracy of digital operation and, preferably, the constant value once applied to comparator 15 is used to digitally compute a variation in the pulse difference signal supplied thereby to similarly preserve accuracy in operation.

The system of indicating measured values according to the present invention can be utilized with various pulse generators supplying pulses corresponding to a measured value including capacitive transmitters, inductive transmitters and tacho-generators. The optical system illustrated in FIG. 2 is particularly suitable for use with the present invention, however, since the light source and the electronic components can be disposed in a tachometer casing while a light interrupting element can be positioned remote from the casing while utilizing fiberoptic elements to transmit and receive light therefrom. The use of such an optical system has the advantage, when utilized to indicate the speed of movement of vehicles, of providing protection against fraudulent manipulations since the fiberoptic elements cannot be broken to stop operation and then joined together again.

Inasmuch as the present invention is subject to many variations, modifications and changes in detail, it is intended that all matter discussed above or shown in the accompanying drawings be interpreted as illustrative and not in a limiting sense.

What is claimed is:

1. A speed indicating system comprising: electric sensor means for generating electric pulses with a frequency proportional to the value of a measured speed; first and second counter means connected with the sensor means and with each other for counting the number of said generated pulses in first and second equivalent periods of time, as determined by timer means for enabling the counter means for said periods of time, the periods following one after each other; comparator means coupled to the output of both said counter means for comparing the number of counted pulses in the counter means and delivering a pulsed signal representative of the difference and the direction of said difference of said pulses; storing means connected with the comparator means for storing said signal representative of the pulse difference; a single stepping motor drivable in two directions and connected with the storing means to receive stored signals therefrom and operated in an appropriate one of said directions depending upon said stored signals representative of the pulse difference; and an indicator element being fastened on the axis of said stepping motor giving speed informations analogous to its angle deflection upon operation of the stepping motor.

2. A speed indicating system as recited in claim 1 wherein said timing signal generating means includes a quartz oscillator circuit utilized to drive a clock representing an indication of time.

3. A speed indicating system as recited in claim 1 wherein said electric sensor means includes a light source, a photoelectric detector responsive to light from said light source, a rotating member disposed to interrupt light supplied from said light source to said photoelectric detector, and a pulse forming circuit operating in response to said photoelectric element.

4. A speed indicating system as recited in claim 3, wherein said electric sensor means includes fiberoptic means supplying light from said light source to said rotating member and from said rotating element to said photoelectric detector.

5. A speed indicating system as recited in claim 1 wherein said stepping motor means includes a gear unit driving a pointer.

6. A speed indicating system as recited in claim 5, wherein the value measured is rotation of a member corresponding to movement of a vehicle and said pointer indicates speed of movement of the vehicle.

7. A speed indicating system as recited in claim 7, wherein said first counter means receives and counts said pulses from said electric sensor means and produces a pulse count signal, said second counter means receiving said pulse count signal from said first counter means and producing a pulse count signal corresponding thereto, and timing signal generating means coupled with said first counter means to operate said first counter means to count said pulses from said electric sensor means for a predetermined time interval and then transfer said pulse count signal to said second counter means.

8. A speed indicating system as recited in claim 7, wherein means are connected with said storing means for supplying a constant frequency signal to said storing means for causing said pulse difference signal to be transmitted to said stepping motor means.

9. A speed indicating system as recited in claim 1, wherein function generator means is connected with one of said counter means for varying said pulse count signals in accordance with a constant value received from said function generator.

10. A speed indicating system as recited in claim 9, wherein said function generator means produces digital signals.

11. A speed indicating system as recited in claim 1, wherein function generator means is connected with said comparator means for supplying a constant value to said comparator means for varying said pulse difference signal.

* * * * *